(12) United States Patent
Rachwal

(10) Patent No.: US 9,988,524 B2
(45) Date of Patent: *Jun. 5, 2018

(54) COMPOSITE POLYMER MODIFIERS

(71) Applicant: Arkema Inc., King of Prussia, PA (US)

(72) Inventor: Lisa B. Rachwal, Harleysville, PA (US)

(73) Assignee: Arkema Inc., King of Prussia, PA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/741,496

(22) Filed: Jun. 17, 2015

(65) Prior Publication Data

US 2015/0284553 A1 Oct. 8, 2015

Related U.S. Application Data

(63) Continuation of application No. 13/203,489, filed as application No. PCT/US2010/025171 on Feb. 24, 2010, now Pat. No. 9,085,679.

(60) Provisional application No. 61/155,573, filed on Feb. 26, 2009.

(51) Int. Cl.
| | |
|---|---|
| *C08L 33/00* | (2006.01) |
| *C08L 27/06* | (2006.01) |
| *C08J 3/12* | (2006.01) |
| *C08J 3/21* | (2006.01) |
| *C08J 3/22* | (2006.01) |
| *C09C 1/02* | (2006.01) |
| *C09C 3/10* | (2006.01) |
| *C08J 3/16* | (2006.01) |
| *C08K 3/26* | (2006.01) |
| *C08K 5/098* | (2006.01) |
| *C08K 5/11* | (2006.01) |
| *C08L 33/12* | (2006.01) |
| *C08L 33/08* | (2006.01) |
| *C08L 33/10* | (2006.01) |

(52) U.S. Cl.
CPC ............... *C08L 27/06* (2013.01); *C08J 3/12* (2013.01); *C08J 3/128* (2013.01); *C08J 3/16* (2013.01); *C08J 3/21* (2013.01); *C08J 3/226* (2013.01); *C08K 3/26* (2013.01); *C08K 5/098* (2013.01); *C08K 5/11* (2013.01); *C08L 33/12* (2013.01); *C09C 1/021* (2013.01); *C09C 3/10* (2013.01); *C01P 2004/03* (2013.01); *C01P 2004/62* (2013.01); *C08J 2327/06* (2013.01); *C08J 2433/08* (2013.01); *C08J 2433/10* (2013.01); *C08K 2003/265* (2013.01); *C08L 33/08* (2013.01); *C08L 33/10* (2013.01); *C08L 2205/06* (2013.01); *Y10T 428/139* (2015.01)

(58) Field of Classification Search
CPC ......... C08J 3/21; C08J 3/12; C08J 3/16; C08J 2433/08; C08L 33/08
See application file for complete search history.

(56) References Cited

U.S. PATENT DOCUMENTS

| | | |
|---|---|---|
| 3,287,443 A | 11/1966 | Saito |
| 3,562,235 A | 2/1971 | Ryan |
| 3,657,391 A | 4/1972 | Curfman |
| 3,678,133 A | 7/1972 | Ryan |
| 3,808,180 A | 4/1974 | Owens |
| 3,985,703 A | 10/1976 | Ferry |
| 3,985,704 A | 10/1976 | Jones |
| 4,096,202 A | 6/1978 | Farnham |
| 4,180,494 A | 12/1979 | Fromuth |
| 4,260,693 A | 4/1981 | Liu |
| 4,278,576 A | 7/1981 | Goldman |
| 4,299,928 A | 11/1981 | Witman |
| 4,301,060 A | 11/1981 | Underwood et al. |
| 5,773,520 A | 6/1998 | Bertelo |
| 7,217,747 B2 * | 5/2007 | Weier ................ C08F 265/04 523/201 |
| 2002/0072552 A1 | 6/2002 | Wills et al. |
| 2002/0072566 A1 | 6/2002 | Willis et al. |
| 2004/0110900 A1 | 6/2004 | Lau et al. |
| 2005/0119419 A1 | 6/2005 | Blanchard et al. |
| 2006/0069206 A1 | 3/2006 | Cruz |
| 2006/0175728 A1 | 8/2006 | Lavach et al. |
| 2009/0018248 A1 | 1/2009 | Pirri et al. |

FOREIGN PATENT DOCUMENTS

| | | |
|---|---|---|
| EP | 0 263 714 | 4/1988 |
| JP | 59057913 | 4/1984 |
| WO | WO 2007/093565 A1 | 8/2007 |
| WO | WO 2010/099160 A1 | 9/2010 |

OTHER PUBLICATIONS

Greesh et al (Journal of Polymer Science: Part A: Polymer Chemistry, vol. 46, 3619-3628 (2008).*
Specialty Minerals (Calofort U & Multiflex-MM: Nano PCCs for Healthcare, 2013).*

* cited by examiner

*Primary Examiner* — Wenwen Cai
(74) *Attorney, Agent, or Firm* — Lynn B. Morreale

(57) ABSTRACT

The invention relates to composite polymer modifiers for thermoplastic resins, and especially for polyvinyl chloride (PVC). The composite modifier is an intimate blend of mineral filler and polymeric process aid, which is formed by the co-powderization of aqueous emulsions, suspensions or slurries of one or more mineral filler(s) and process aid(s). The resulting composite modifier provides more effective modification of the thermoplastic resin than by the use of the dried components formed separately. The composite modifier may also contain other co-powderized components such as impact modifiers, for additional benefits.

5 Claims, 8 Drawing Sheets

COMPOSITE POLYMER MODIFIERS

CROSS-REFERENCE TO RELATED APPLICATIONS

This application is a continuation of and claims priority to U.S. application Ser. No. 13/203,489, filed Aug. 26, 2011, which is a national stage application under 35 U.S.C. § 371 of PCT/US2010/025171, filed Feb. 24, 2010, which claims priority to U.S. Provisional Application No. 61/155,573, filed on Feb. 26, 2009, all of which are hereby incorporated by reference in their entirety for all purposes.

FIELD OF THE INVENTION

The invention relates to composite polymer modifiers for thermoplastic resins, and especially for polyvinyl chloride (PVC). The composite modifier is an intimate blend of mineral filler and polymeric process aid, which is formed by the co-powderization of aqueous emulsions, suspensions or slurries of one or more mineral filler(s) and process aid(s). The resulting composite modifier provides more effective modification of the thermoplastic resin than by the use of the dried components formed separately. The composite modifier may also contain other co-powderized components such as impact modifiers, for additional benefits.

BACKGROUND OF THE INVENTION

Extruders of rigid PVC compounds and other thermoplastic are constantly seeking ways to increase output rates through the purchase of larger extrusion equipment, the redesign of existing equipment or the redesign of formulations using new or improved process aids. Improved output rates result in more economical plant operations that lead to greater profitability for the thermoplastic converters.

Thermoplastic formulations contain a variety of additives, including process aids (both conventional and lubricating), and internal and external lubricants, designed to increase throughput. Typically external lubricants and certain types of process aids, generically described as lubricating process aids may reduce melt viscosity in PVC formulations. Lubricating process aids are typically low molecular weight polymers that have a lubricating function built into the polymer backbone. Generally today's rigid PVC formulations are run without lubricating process aids. Conventional process aids typically used in rigid PVC formulations are high molecular weight polymers, with molecular weights significantly higher than PVC resin and cause increases in melt torque depending on their molecular weight.

In WO/093565, Applicant disclosed a method whereby impact modifiers and mineral fillers were co-dried, resulting in a hybrid impact modifier that overcame problems of dispersion and concentration heterogeneities seen when the dry components were blended.

Applicant has now found that co-powderizing aqueous streams or an aqueous blend of polymeric process aids and mineral fillers results in a composite material in which the dry composite consists of complex particles that contain both the polymer and inorganic phases in an intimate mixture.

SUMMARY OF THE INVENTION

The invention relates to a composite polymer modifier consisting of:

a) from 99 to 1 weight percent of one or more inorganic mineral fillers,
b) from 1 to 99 weight percent of one or more polymeric process aids, and
c) optionally from 0 to 80 weight percent of one or more polymeric impact modifiers, wherein the total adds up to 100 weight percent, and wherein said composite polymer modifier is in the form of complex particles containing both polymer and inorganic mineral fillers in intimate contact.

The invention also relates to a process of forming the composite polymer modifier involving a) blending aqueous solutions, dispersions, suspensions or emulsions of one or more polymeric process aids with one or more mineral fillers, which may come in the form of either an aqueous dispersion or a dry powder, and optionally with an aqueous dispersion of one or more impact modifiers to form a homogenous aqueous blend, and then b) powderizing said aqueous blend to form composite polymer modifier particles.

The invention further relates to compounds formed by formulating the composite polymer modifier into a thermoplastic resin, optionally with other additives.

BRIEF DESCRIPTION OF THE DRAWINGS

FIG. 1. Modifier A (Magnification is 2500×) This is a comparative example in which the process aid/impact modifier and mineral filler were dry-blended. The large dark gray spheres are the process aid/impact modifier. The lighter colored particles on the surface of the acrylic spheres is the $CaCO_3$.

FIG. 2. Modifier F (Magnification is 500×) This is a comparative example in which the process aid/impact modifier and mineral filler were dry-blended. The large dark gray spheres are the process aid/impact modifier. The image shows that when 35% $CaCO_3$ is post added to the acrylic modifier, there is so much $CaCO_3$ on the outside of the acrylic modifier that the acrylic modifier is barely visible.

FIG. 3. Modifier B, of the invention, image is taken before the addition of the flow aid (Magnification is 5000×) When compared to FIGS. 1 and 2, this image shows that even though this product contains approximately 35% $CaCO_3$, the $CaCO_3$ cannot be seen on the surface of the process aid/impact modifier even at a higher magnification indicating that the $CaCO_3$ is intimately blended into the process aid/impact modifier.

FIG. 4. Modifier E (Magnification is 500×) Comparative. The image shows that when $CaCO_3$ is post mixed with an acrylic process aid, the $CaCO_3$ coats the outsides surface of the modifier.

FIG. 5. Modifier D (Magnification is 2500×) Of the Invention. When compared to image 4, this image shows that even though the final powder contains approximately 35% $CaCO_3$, the $CaCO_3$ is not on the surface of the acrylic process aid, but is intimately blended into the process aid.

FIG. 7. Foamed PVC formulated and extruded using PLASTISTRENGTH 530 (Magnification is 100×) Comparative. The image shows the cell structure of a foamed PVC extrudate made using PLASTISTRENGTH 530 acrylic process aid.

FIG. 8. Foamed PVC formulated and extruded using Modifier D (Magnification is 100×) Of the Invention. When compared to FIG. 7, the image shows that many more foam cells are present indicating that this new method of introducing CaCO$_3$ into a foam PVC compound leads to a better cell structure.

DETAILED DESCRIPTION OF THE INVENTION

Figure 1:
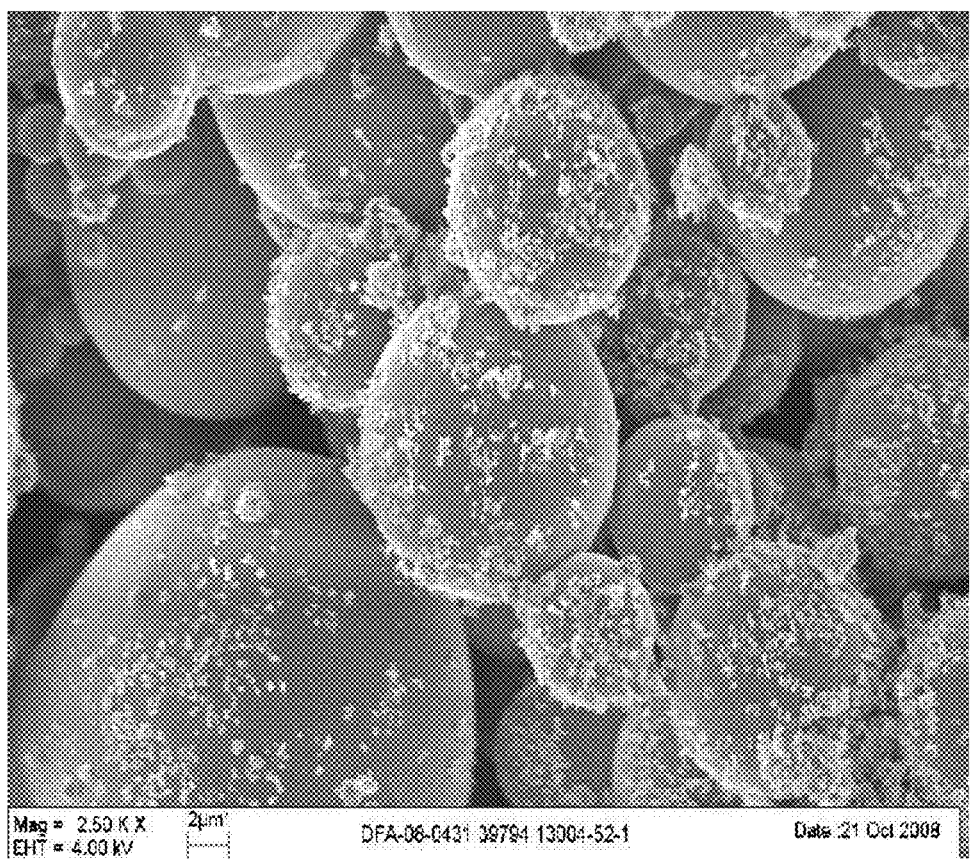
FIGS. 1-5, 7 and 8 are Scanning Electron micrographs

The invention relates to composite polymer modifier particles that are an intimate blend of polymeric process aids and inorganic fillers, and also to a method for producing the composite polymer modifiers by the co-powderizing of aqueous streams of polymer process aids and mineral fillers.

The process aids of the invention are preferably high molecular weight copolymers that both promote fusion of a thermoplastic into melts that can be readily processed, and also alters the melt rheology of the thermoplastic. The process aids are miscible with the thermoplastic resin they will be modifying in the melt state. In one embodiment, two or more different process aids can be combined.

The acrylic copolymer process aids are present in the thermoplastic composition at from 0.1 to 15 weight percent, preferably from 1 to 5 weight percent, and more preferably from 2 to 4 weight percent. By "copolymers" as used herein is meant polymers having two or more different monomer units—including terpolymers and polymers having 3 or more different monomers. The copolymers could be random, block, gradient or of other architectures. The copolymers could be linear, branched, or crosslinked. The copolymers may contain one or more functional groups, or may be unfunctionalized. "Acrylic copolymers" as used herein, refers to copolymers having 60 percent or more of acrylic and/or methacrylic monomer units. "(meth) acrylate" is used herein to include both the acrylate, methacrylate or a mixture of both the acrylate and methacrylate. Useful acrylic monomers include, but are not limited to methyl (meth)acrylate, ethyl (meth)acrylate, n-propyl (meth)acrylate, isopropyl (meth)acrylate, n-butyl (meth)acrylate, isobutyl (meth)acrylate sec-butyl (meth)acrylate, tert-butyl (meth)acrylate, amyl (meth)acrylate, isoamyl (meth)acrylate, n-hexyl (meth)acrylate, cycloheyl (meth)acrylate, 2-ethylhexyl (meth)acrylate, pentadecyl (meth)acrylate, dodecyl (meth)acrylate, isobornyl (meth)acrylate, phenyl (meth)acrylate, benzyl (meth) acrylate, phnoxyethyl (meth)acrylate, 2-hydroxyethyl (meth)acrylate and 2-methoxyethyl (meth)acrylate. Preferred acrylic monomers include methyl acrylate, ethyl acrylate, butyl acrylate, and 2-ethyl-hexyl-acrylate, methyl methacrylate, ethyl methacrylate, and butyl methacrylate.

Reactive copolymer process aids may be formed from any monomers containing two or more chain reactive chemical groups that can be used to form branched or crosslinked polymer structure. Useful monomers include, but are not limited to (meth)acrylic acid acetoacetoxyalkyl esters and amides. Some examples include acetoacetoxyethyl(meth) acrylate ("AAEM"), acetoacetoxypropyl(meth)acrylate, acetoacetoxybutyl(meth)acrylate, 2,3-di(acetoacetoxy)propyl(meth)acrylate, acetoacetoxyethyl(meth)acrylamide, 2-cyanoacetoxyethyl(meth)acrylate, 2-cyanoacetoxyethyl (meth)acrylamide, N-cyanoacetyl-N-metylaminoethyl (meth)acrylate, and N-(2 propionylacetoxybutyl) (meth) acrylamide.

In addition to the acrylic monomer units, the acrylic copolymer of the invention can also include up to 40 percent of other ethylenically unsaturated monomers polymerizable with the acrylic monomers, including, but not limited to styrene, alpha-methyl styrene, butadiene, vinyl acetate, vinylidene fluorides, vinylidene chlorides, acrylonitrile, vinyl sulfone, vinyl sulfides, and vinyl suloxides. In one embodiment, the copolymer contains styrene.

In one preferred embodiment the process aid is an acrylic copolymer or terpolymers, with one example being an acrylic terpolymer of methylmethacrylate, and butyl acrylate with or without styrene.

The copolymer of the invention generally has a weight average molecular weight in the range of 50,000 to 10,000,000 g/mol, preferably 500,000 to 5,000,000. g/mol.

In another embodiment, the acrylic copolymer comprises 10-90 weight percent of methyl methacrylate units, 10 to 50 weight percent of butyl acrylate units, 0 to 50 weight percent of butyl methacrylate units, and from 0 to 80 weight percent of styrene, the total adding to 100 percent.

The copolymer of the invention can be made by conventional polymerization techniques, including, but not limited to mass, bulk, solution, suspension, emulsion and inverse emulsion polymerization. The process aid will be present in an aqueous form for use in the process to form the composite polymer modifier of the invention, and therefore polymerization as an emulsion polymer latex, or aqueous suspension are preferred. The solids content of the aqueous process aid solution, suspension or dispersion is generally between 15-50 percent solids, and more preferably between 30-45%.

The mineral filler, for use in the invention may be treated or non-treated, and includes, but is not limited to, ground natural calcium carbonate (GCC), precipitated calcium carbonate (PCC), nanosized PCC (NPCC), silica (fumed or precipitated), clay, Montmorillonite (nano-clay), zeolite, perlite or any other type of inorganic material that can be obtained either as a slurry or as a dry powder. The mineral filler can also be a mixture of two or more different mineral fillers.

The aqueous mineral filler suspension, dispersion or slurry of the invention is a water dispersion of mineral filler with a solid content advantageously between 5 and 90% by weight, preferably between 40 and 80%, This water dispersion can contain any specific surfactant, dispersing agent, additive or filler surface treatment that can advantageously improve the quality of the slurry (stability, viscosity or compatibility with the host matrix). The composite modifier is formed by co-powderizing an aqueous suspension, solution, or dispersion (latex) of the process aid, and an aqueous slimy of the mineral filler. The ratio of solid process aid to mineral filler solids is dependent on the final application, and if other components, such as an impact modifier are also part of the composite modifier. The ratio of process aid to mineral filler is from 99:1 to 1:99, preferably from 75:1 to 1:50.

The blending and powderization can be done in several ways.

Powderization of the aqueous stream(s) can occur by any means known in the art, including but not limited to spray drying, drum drying, coagulation, freeze coagulation or freeze drying. Following a coagulation step, the composite polymer modifier may be filtered before drying.

In a first embodiment, the aqueous process aid and the aqueous mineral filler dispersion are blended to form a homogeneous aqueous blend. More than one process aid(s) and more than one aqueous mineral filler dispersion(s) can be blended together. This blend is then powderized.

In a second embodiment, the aqueous process aid and aqueous mineral filler are introduced separately but simultaneously into the dryer and are blended together during the powderization process. Several different aqueous streams of process aids and/or mineral fillers may be used. In the case of spray drying, this blending/powderization can be accomplished by the simultaneous introduction into the drying chamber of the separate aqueous streams through separate nozzles.

In a third embodiment, the aqueous process aid is mixed with a dry powder mineral filler and blended to form a homogeneous aqueous blend. More than one process aid(s) and more than one dry, powder mineral filler(s) can be blended together. This blend is then converted to a powder.

A combination of the two processes is also contemplated by the invention, with some or all of each component being pre-blended or blended during the powderization process.

Other aqueous components can also be co-powderized with the process aid and mineral filler in a similar manner. In one preferred embodiment, an aqueous solution, suspension or latex of impact modifier(s) is added into the powderization process—either as an aqueous mixture of all three (process aid, mineral filler, and impact modifier) components, or separately introduced and blended at a point before final drying—such as through separate nozzles in a spray dryer.

Impact modifiers useful in the invention, either as part of the co-powderized composite, or added separately include core-shell and linear copolymer or terpolymer impact modifiers, as known in the art. These are added at from 0 to 80 weight percent based on the polymer composite modifier. Examples of useful impact modifiers include, but are not limited to: methacrylate-butadiene-styrene copolymers (MBS), acrylonitrile-butadiene-styrene copolymers (ABS) or acrylic core/shell polymers (AIM) as well as CPE (chlorinated polyethylene). Those modifiers are generally synthesized in water phase through emulsion or suspension polymerization processes or chlorination of HDPE in slurry state for CPE preparation. In one embodiment acrylic core shell impact modifiers are included in the composite polymer modifier.

Figure 2:
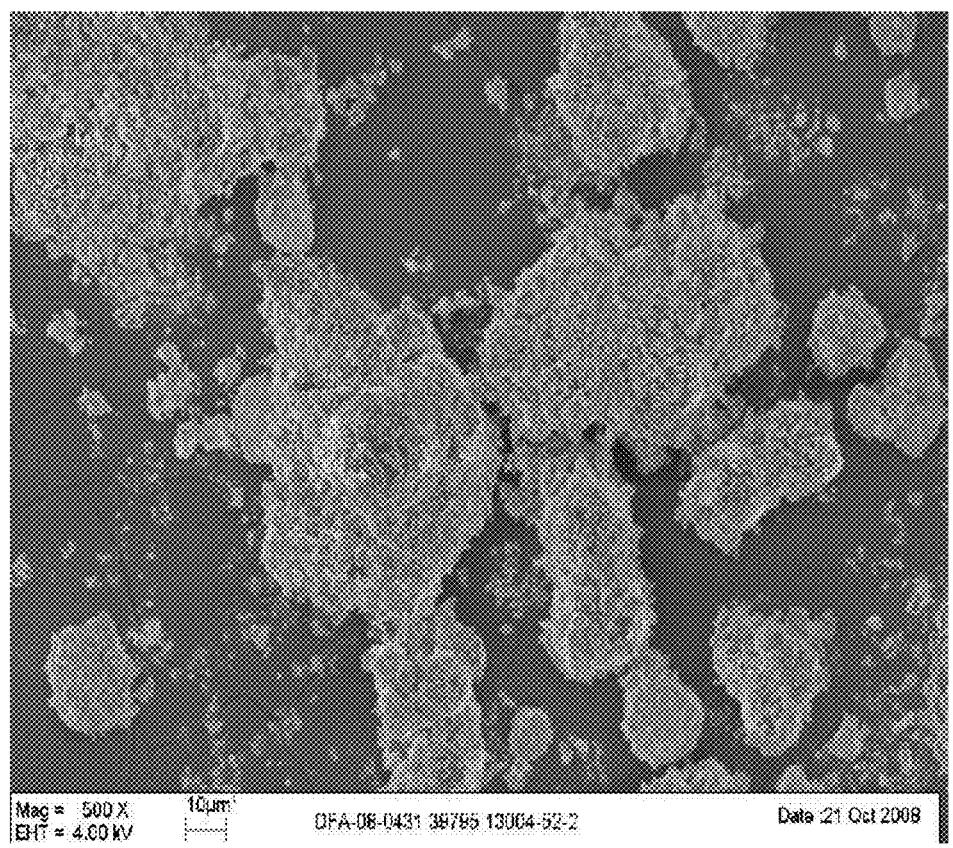
Figure 3:
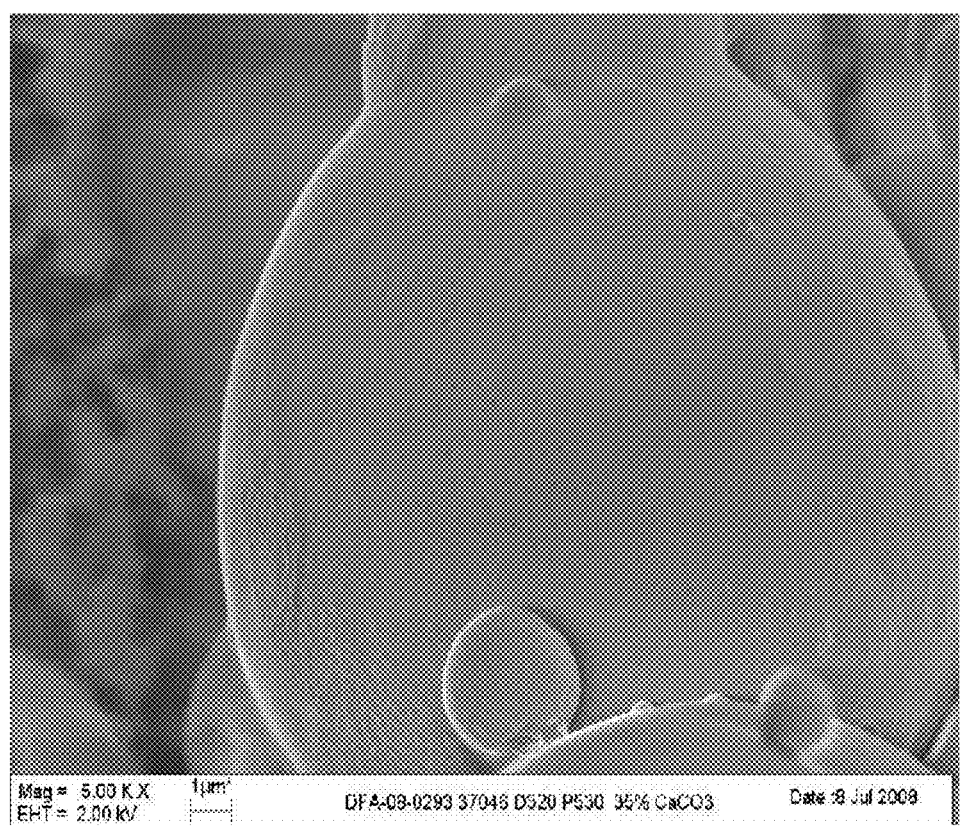
Figure 4:
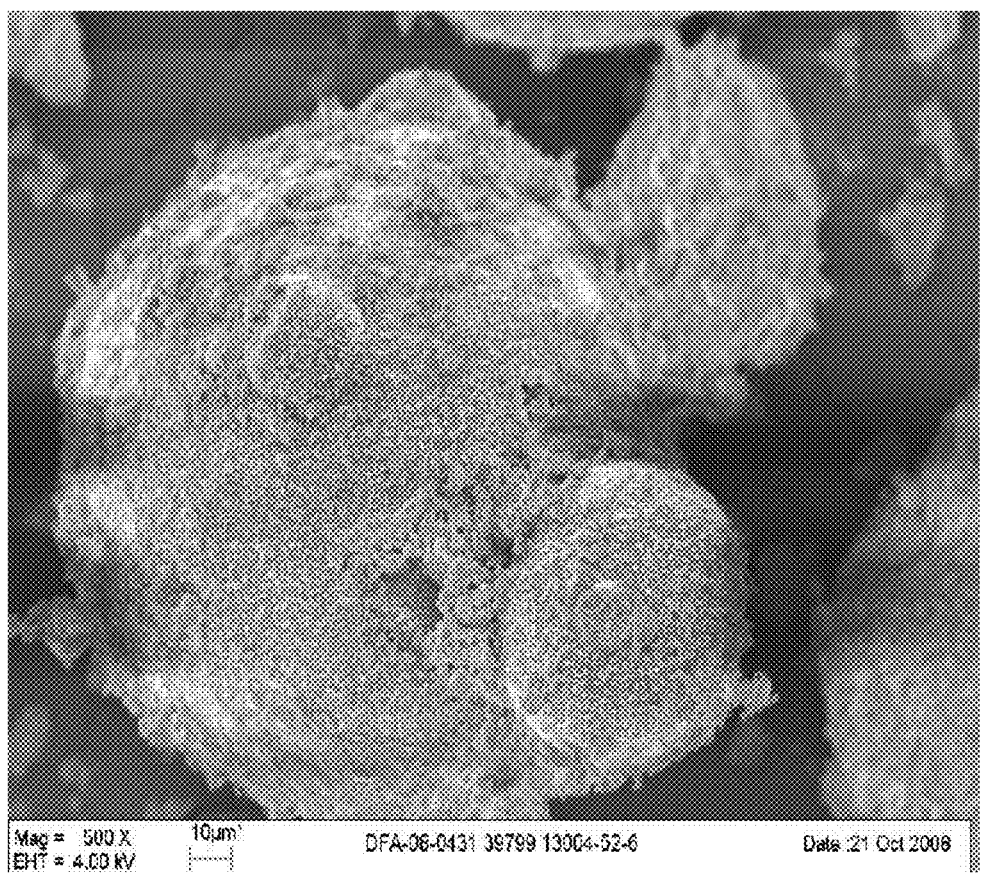
Figure 5:
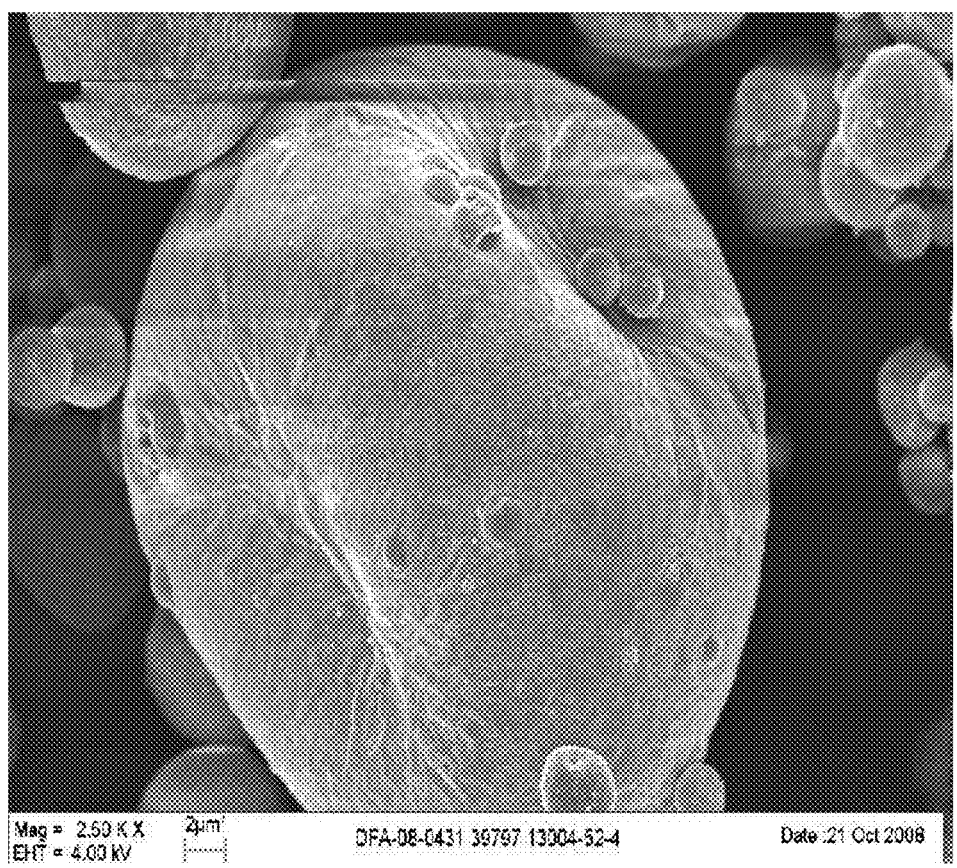
Figure 6:
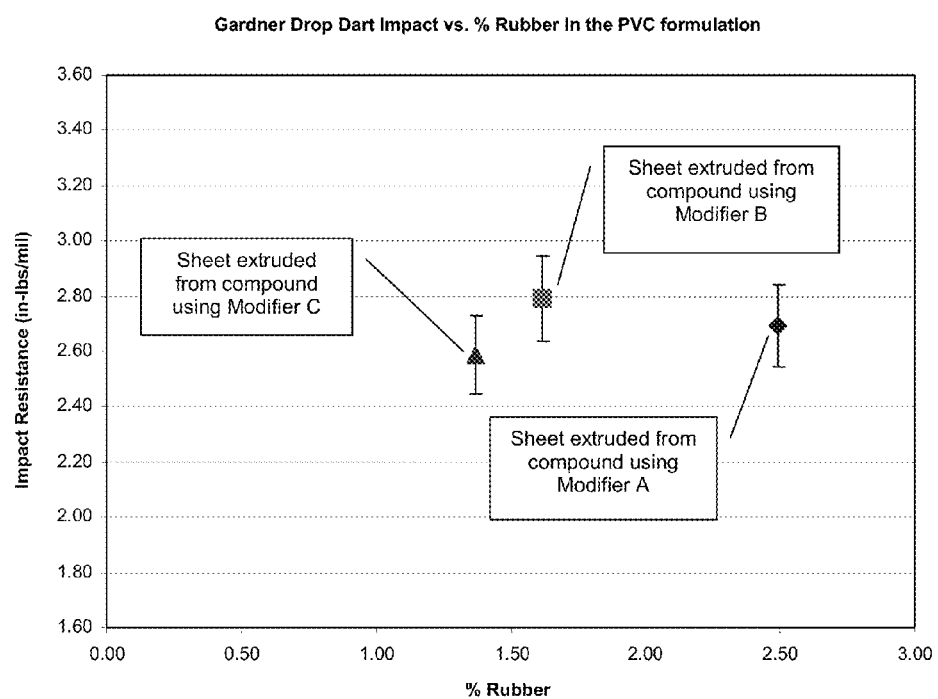
FIG. 6. Is a plot of Gardner drop dart impact testing, showing synergy between the intimately mixed $CaCO_3$ and the acrylic modifier.
Figure 7:
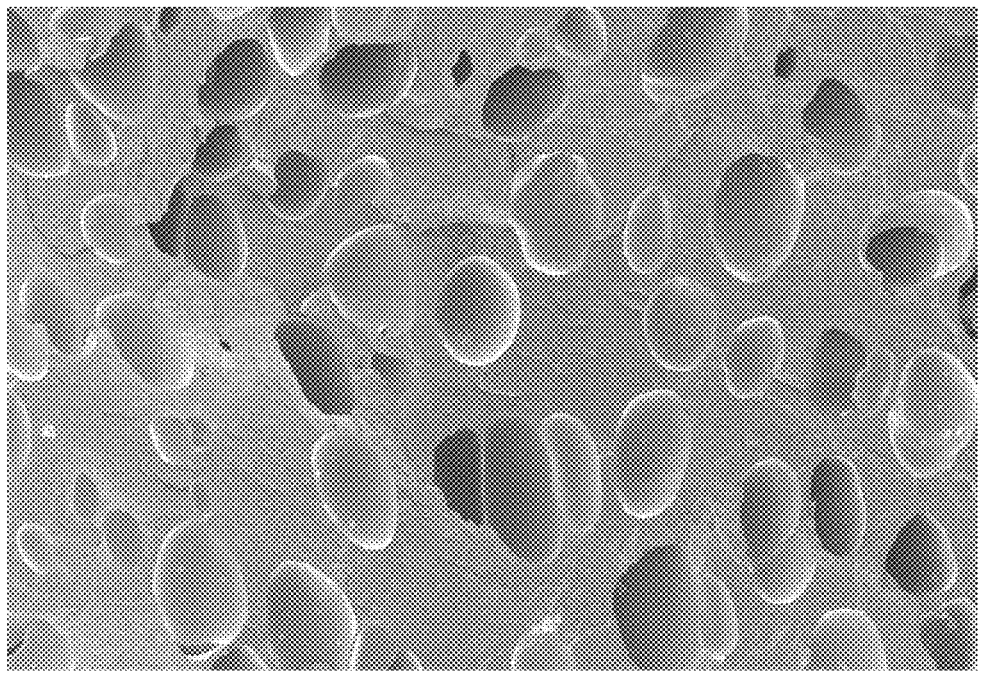
Figure 8:
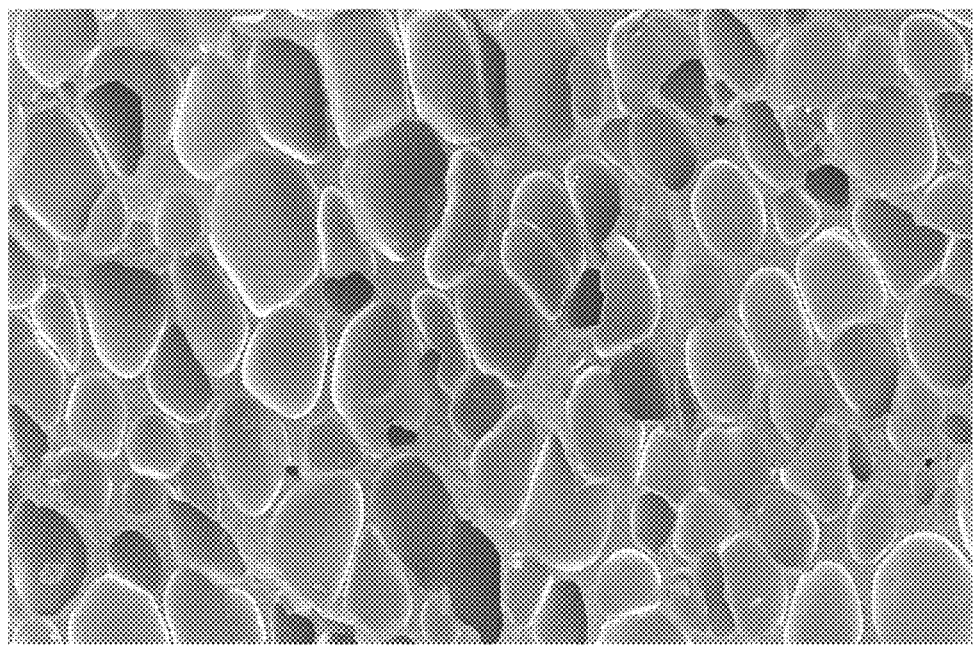

Whatever the process used to form the composite polymer modifier, the final product is considered as a complex polymer modifier being either a composite modifier when the original mineral part consists in primary particles with sizes in the micrometer scale, or a nanocomposite modifier when the mineral part consists in primary particles with sizes in the nanometer scale. The resulting powder material consists in complex particles that contains both organic and inorganic phases, intimately mixed together, as shown in FIGS. 1-8 (micrographs).

The composite polymer modifiers of the invention are used to modify the properties of thermoplastic(s) during manufacturing.

Thermoplastics in which the composite polymer modifier of the invention may be useful include, but are not limited to alkyl (meth)acrylate polymers and copolymers, acrylonitrile/butadiene/styrene terpolymers, acrylonitrile/styrene/acrylate copolymers, polycarbonates, polyesters such as poly(butylene terephthalate) and poly(ethylene terephthalate), methacrylate/butadiene/styrene copolymers, high impact polystyrene, acrylonitrile/acrylate copolymers, acrylonitrile/methyl methacrylate copolymers, polyolefins, chlorinated poly(vinyl chloride) (CPVC), and poly(vinyl chloride) (PVC), polyamides, polyetheresteramides (PEBAX), or alloys of the abovementioned polymers. The thermoplastic polymer can also be composed of a homopolymer of a vinylidene halide, such as 1,1-dichloroethylene or 1,1-difluoroethylene. Biodegradable polymers, such as polylactide or polyhydroxy butyrate are also contemplated by the invention.

In a preferred embodiment, the thermoplastic is PVC or an alloy thereof, such as PVC/butyl acrylate, used in rigid PVC applications.

Other additives, such as heat stabilizers, internal and external lubricants, other process aids, melt strength additives, other fillers, other impact modifiers, flow aids, and pigments may also be added into a final thermoplastic formulation. Additional mineral filler, impact modifier and/or process aid may be added in addition to the amount used in the composite polymer modifier.

The dried composite polymer modifier is formulated with a thermoplastic polymer powder, and optionally other additives, by means known in the art—generally as a dry blend of components—and blended until a homogeneous compound is obtained. The blended compound of composite polymer modifier, thermoplastic and other additives is then formed into objects by conventional melt processing techniques (e.g.: injection molding, extrusion, calendaring, blow molding, foaming and thermoforming, etc. . . . ). The composite polymer modifier powder and thermoplastic as a powder or pellets, could also be added together into the extrusion equipment, however it is more difficult to obtain a homogeneous blend.

During the admixing, each phase of the modifier (organic and inorganic) is individually dispersed down to their own original primary particle size into the host thermoplastic matrix. Due to the high compatibility of the composite polymer modifier with the host thermoplastic matrix, the mineral filler is able to better disperse into this matrix than it usually does when introduced directly as a separate powder.

The composite polymer modifiers of the present invention provide several advantages, believed due to the fact that the resultant composite polymer modifier powder consists of complex particles that contain both polymer and inorganic filler phases, intimately mixed together. The intimate mixture reduces the separation of components during transport, provides increased flowability for the polymer particles, and aids in better dispersion of the inorganic mineral filler in the thermoplastic resulting in a more homogeneous modified thermoplastic when compared to the dispersion of the two powder components added separately into the thermoplastic. Thus there is a clear synergy between the process aid, mineral filler, and optional impact modifier when prepared by the co-powderization process describe in the present invention.

The process for preparing the composite polymer modifier can also be considered as a new way of introducing a mineral filler into a plastic matrix through its intimate combination with an organic process aid, allowing for good dispersion of both standard mineral fillers having surface treatments for compatibility with the host plastic matrix, as well as mineral fillers without any surface treatment. In other words, the polymeric process aid may act as a compatibilizer for the mineral filler with respect to the host polymer matrix.

The thermoplastic modified by the composite polymer modifiers of the invention, can be used to manufacture a variety of objects, including, but not limited to: construction products (siding, window profiles, flooring, fencing), pipe, foams, etc. One of skill in the art, based on the description and examples provided, can imagine a wide-range of uses for the composition of the invention.

In foam applications, the composite polymer modifier generally contains only process aid and mineral filler. In foam, the mineral filler (typically $CaCO_3$) is generally used at about 2 to 20 weight percent, and the process aid is generally used at about 4 to 14 weight percent based on the thermoplastic.

In flooring applications, the composite polymer modifier generally contains only process aid and mineral filler. The mineral filler level can be generally from 20 weight percent to as high as 90 weight percent and the process aid is generally used at about 0.5 to 3.5 weight percent based on the thermoplastic.

In pipe applications the composite polymer modifier may contain impact modifier in addition to process aid and mineral filler. The mineral filler level can be generally from 1 weight percent to 45 weight percent, the process aid is generally used at about 0.5 to 7 weight percent based on the thermoplastic, and impact modifier is used at from 0 to 7 weight percent.

In siding and fence applications the composite polymer modifier may contain impact modifier in addition to process aid and mineral filler. The mineral filler level can be generally from 2 weight percent to 20 weight percent, the process aid is generally used at about 0.3 to 4 weight percent based on the thermoplastic, and impact modifier is used at from 1 to 7 weight percent.

EXAMPLES

The following materials are used in the Examples:
PLASTISTRENGTH 530 latex—an acrylic co-polymer of methylmethacrylate and butyl acrylate (Arkema)
DURASTRENGTH 320 latex—acrylic impact modifier (Arkema)
PLASTISTRENGTH 530 process aid (Arkema)
PLASTISTRENGTH 770 process aid (Arkema)
$CaCO_3$ slurry (OMYACARB UF-SY at 75.5% solids in water available from OMYA)
PVC resin K67
PVC Resin K59
THERMOLITE 140—butyltin mercaptide heat stabilizer from (Arkema)
THERMOLITE 161—methyl tin heat stabilizer from (Arkema)
Lubricant 1=calcium stearate as an internal lubricant
Lubricant 2=lubricant package consisting of hydrocarbon wax, fatty acid ester, oxidized polyethylene, and polyethylene available from Honeywell.
Lubricant 3=paraffin wax with a melting point of 165° F.
Lubricant 4=oxidized polyethylene wax
$CaCO_3$ (GCC, 0.7 microns, used as part of the PVC compound)
$CaCO_3$ powder (pcc, 0.07 microns, used as a flow aid for the process aid/impact modifier)
TiO2=titanium dioxide Azodicarbonamide=Exothermic Chemical Blowing Agent Unless otherwise noted, all percentages are weight percentages, and any molecular weight is a weight average molecular weight.

Example 1 Modifier A: (Comparative)

294 g PLASTISTRENGTH 530 latex, and 2500 g of DURASTRENGTH 320 latex were mixed together with an agitator until homogeneous. The blend was then spray dried to recover the solids. The resulting acrylic powder had ratio of 10/90 PLASTISTRENGTH 530 to DURASTRENGTH 320. 4 weight percent calcium carbonate (pcc, 0.07 micron) was added to the recovered powder as a flow aid.

Example 2 Modifier B. (of the Invention)

235 g PLASTISTRENGTH 530 latex, 2000 g of DURASTRENGTH 320 latex, 625 g of $CaCO_3$ slurry and 384 g of deionized water were mixed together with an agitator until homogeneous. The blend was then spray dried to recover the solids. The recovered composite polymeric modifier contained approximately 35% $CaCO_3$ with the acrylic portion having a 10/90 ratio of PLASTISTRENGTH 530 to DURASTRENGTH 320. 4 weight percent calcium carbonate (pcc, 0.07 micron) was added to recovered powder as a flow aid.

Example 3 Modifier C. (of the Invention)

212 g PLASTISTRENGTH 530 latex, 1800 g of DURASTRENGTH 320 latex, 855 g of $CaCO_3$ slurry, and 543 g of deionized water were mixed together with an agitator until homogeneous. The blend was then spray dried to recover the solids. The recovered composite polymeric modifier contained approximately 45% $CaCO_3$, with the acrylic portion have a 10/90 ratio of PLASTISTRENGTH 530 to DURASTRENGTH 320. 4 weight percent calcium carbonate (pcc, 0.07 micron) was added to the recovered powder as a flow aid.

Example 4 Modifier D. (of the Invention)

1000 g PLASTISTRENGTH 530 latex, and 264 g of $CaCO_3$ slurry were mixed together with an agitator until homogeneous. The blend was then spray dried to recover the solids. The recovered composite polymeric modifier contained approximately 35% $CaCO_3$.

Example 5 Modifier E. (Comparative)

32.5 g PLASTISTRENGTH 530 process aid powder was dry mixed with 17.5 g of calcium carbonate (pcc, 0.07 micron) resulting in a powder that contains 65% process aid and 35% $CaCO_3$.

Example 6 Modifier F. (Comparative)

33.85 g Modifier A powder was mixed with 16.15 g of calcium carbonate (pcc, 0.07 micron). The resulting powder contains 65% process aid/impact modifier (at a 10/90 ratio) and 35% $CaCO_3$.

The spray dryer conditions for Modifiers A-D are shown in Table 1: (a NIRO Mobile Minor spray dryer was used)

TABLE 1

| | Modifier A | Modifier B | Modifier C | Modifier D |
|---|---|---|---|---|
| $T_{in}$ (° C.) | 200 | 200 | 200 | 200 |
| $T_{out}$ (° C.) | 75 | 75 | 75 | 75 |
| Atomizing Air (bar) | 2 | 2 | 2 | 2 |
| Jet sweep air (bar) | 2 | 2 | 2 | 2 |
| Air sweep T (° C.) | 75 | 75 | 75 | 75 |
| Damper Position | 0 | 0 | 0 | 0 |
| Water Flow rate (g/min) | 30 | 30 | 30 | 30 |
| Latex rate (g/min) | 47.8 | 54.5 | 54.5 | 54.9 |
| Powder rate (g/min) | 17.8 | 24.5 | 24.5 | 24.9 |

Scanning electron micrographs were obtained as follows: The samples were coated with the Ion Beam Coater with Au/Pd for 10 mins. They were then imaged with the SEM at 50, 100, 500, 5000, 10000 and 20000× magnification. The Leo 1530 SEM was used for SEM imaging.

Examples 7-9 PVC Substrate Formulations

PVC Substrate Formulations, Examples 7-9, were prepared as follows, using the formulations shown in Table 2; In a Henschel FM 10 high intensity mixer were added in order (the temperature increasing due to internal friction):
a) add the PVC resin and stabilizer to the mixer and turn it on, heating to 66° C.
b) add the lubricants (Lubricant 1 and 2) at 66° C.
c) add the acrylic polymer or acrylic polymer/CaCO3 blend (Modifiers A-C) at 72° C.,
d) add the additional $CaCO_3$ (0.7 micron) at 88° C.
e) add the $TiO_2$ at 98° C.
f) mix for an additional 30 seconds, remove the PVC compound from the mixer and allow to cool.

TABLE 2

| | parts per hundred resin | | |
|---|---|---|---|
| Formulations | 1 | 2 | 3 |
| PVC Resin (K 67) | 100 | 100 | 100 |
| THERMOLITE 140 | 1.0 | 1.0 | 1.0 |
| Lubricant 1 | 1.2 | 1.2 | 1.2 |
| Lubricant 2 | 1.2 | 1.2 | 1.2 |
| Modifier A | 4.0 | | |
| Modifier B | | 4.0 | |
| Modifier C | | | 4.0 |
| CaCO3 (GCC, 0.7μ) | 15.0 | 15.0 | 15.0 |
| TiO2 (Non-chalking) | 0.5 | 0.5 | 0.5 |

The PVC compound was formed into a sheet in the following manner: The PVC compound was added to a Brabender conical twin screw extruder with a 6 inch flex-lip sheet die. The PVC compound was extruded into a sheet to a thickness of about 40 mils. The extruder settings used were: Zone 1, 172° C.; Zone 2, 176° C.; Zone 3, 183° C.; die 182° C.; screw speed, 35 rpm; and feeder setting of 55.

Following cooling of the formed sheet, a dart drop impact test was performed using ASTM D 4226, procedure A to calculate the normalized mean failure energy (normalized mean impact resistance) of each extruded compound. The results are shown as a graph in FIG. 6. The graph shows that as the percentage of $CaCO_3$ that is intimately mixed with the acrylic modifier (process aid+impact modifier) increases, the normalized mean impact resistance remains the same even though the percentage of rubber in the compound is decreasing. As the normalized mean impact resistance would be expected to decrease as the % rubber decreases, it shows that there is a synergy between the intimately mixed $CaCO_3$ and the acrylic modifier.

Examples 10-11 PVC Foam Formulations

PVC Formulations, Examples 10-11, were prepared as follows, using the formulations shown in Table 3;
In a Henschel FM 10 high intensity mixer were added in order (the temperature increasing due to internal friction):
g) add the PVC resin and stabilizer to the mixer and turn it on, heating to 66° C.,
h) add the lubricants (Lubricant 1, 3, and 4) at 66° C.
i) add the process aid at 72° C.
j) add the additional $CaCO_3$ (0.7 micron) and azodicarbonamide at 88° C.
k) add the $TiO_2$ at 98° C.
l) mix for an additional 30 seconds, remove the PVC compound from the mixer and allow to cool,

TABLE 3

| | parts per hundred resin | |
|---|---|---|
| Formulations | 4 | 5 |
| PVC Resin (K59) | 100 | 100 |
| THERMOLITE 161 | 3.0 | 3.0 |
| Lubricant 1 | 0.7 | 0.7 |
| Lubricant 3 | 1.0 | 1.0 |
| Lubricant 4 | 0.15 | 0.15 |
| PLASTISTRENGTH 530 | 10.0 | |
| Modifier D | | 10.0 |
| PLASTISTRENGTH 770 | 2.0 | 2.0 |
| CaCO3 (GCC, 0.7μ) | 5.0 | 5.0 |
| TiO2 (chalking) | 4.0 | 4.0 |
| Azodicarbonamide | 0.35 | 0.35 |

These compounds were extruded using a Brabender ¾" 25:1 L/D single screw extruder with a rectangular (2"×⅛") profile die. The extruder settings used were: Zone 1, 181° C.; Zone 2, 181° C.; Zone 3, 181° C.; die 178° C.; screw speed, 75 rpm. Extrudate samples were collected and cooled in a water bath. The SEM images shown in FIGS. 7 and 8 were generated from these samples to show differences in the cell structure.

What is claimed is:
1. A composite polymer modifier consisting of:
a) from 99 to 1 weight percent of one or more inorganic mineral fillers,
b) from 1 to 99 weight percent of one or more polymeric process aids wherein said one or more process aids is an acrylic copolymer including one or more acrylic monomers selected from the group consisting of methyl acrylate, ethyl acrylate, butyl acrylate, 2-ethyl-hexylacrylate, methyl methacrylate, ethyl methacrylate, and butyl methacrylate and having a molecular weight of 50,000 to 10,000,000 g/mol, and
c) optionally from 0 to 80 weight percent of one or more polymeric impact modifiers, wherein said one or more polymeric impact modifier is selected from the group consisting of core-shell impact modifiers, and linear copolymer impact modifiers,
   wherein the total adds up to 100 weight percent, and wherein said composite polymer modifier is in the form of powdered, substantially homogeneously blended complex particles containing both polymer and inorganic mineral fillers in intimate contact, and wherein said composite polymer modifier is formed by a process comprising the steps of:
a) blending aqueous solutions, dispersions, suspensions or emulsions of said one or more polymeric process aids with said one or more mineral fillers which may be in the form of either an aqueous dispersion or a dry powder, and optionally with an aqueous dispersion of said one or more impact modifiers to form a homogenous aqueous blend, and
b) powderizing said aqueous blend to form said composite polymer modifier.
2. The composite polymer modifier of claim 1, wherein the ratio of said one or more polymeric process aid to said one or more mineral filler is from 75:1 to 1:50.

3. The composite polymer modifier of claim 1 wherein said acrylic copolymer is an acrylic copolymer including one or more acrylic monomers selected from the group consisting of methyl methacrylate, butyl acrylate, butyl methacrylate, ethyl acrylate, and further optionally including styrene polymerizable with the acrylic monomer.

4. The composite polymer modifier of claim 1 wherein said one or more impact modifier is selected from the group consisting of methacrylate-butadiene-styrene copolymers, acrylonitrile-butadiene-styrene copolymers, and acrylic core/shell polymers.

5. A composite polymer modifier consisting of:
a) from 99 to 1 weight percent of one or more inorganic mineral fillers wherein said one or more mineral fillers is untreated,
b) from 1 to 99 weight percent of one or more polymeric process aids wherein said one or more process aids is an acrylic copolymer including one or more acrylic monomers selected from the group consisting of methyl acrylate, ethyl acrylate, butyl acrylate, 2-ethyl-hexyl-acrylate, methyl methacrylate, ethyl methacrylate, and butyl methacrylate and having a molecular weight of 50,000 to 10,000,000 g/mol, and
c) optionally from 0 to 80 weight percent of one or more polymeric impact modifiers, wherein said one or more polymeric impact modifier is selected from the group consisting of core-shell impact modifiers, and linear copolymer impact modifiers,
wherein the total adds up to 100 weight percent, and wherein said composite polymer modifier is in the form of powdered, substantially homogeneously blended complex particles containing both polymer and inorganic mineral fillers in intimate contact, and wherein said composite polymer modifier is formed by a process comprising the steps of:
a) blending aqueous solutions, dispersions, suspensions or emulsions of said one or more polymeric process aids with said one or more mineral fillers which may be in the form of either an aqueous dispersion or a dry powder, and optionally with an aqueous dispersion of said one or more impact modifiers to form a homogenous aqueous blend, and
b) powderizing said aqueous blend to form said composite polymer modifier.

* * * * *